March 18, 1930.  P. W. DIETER  1,750,926
LOCK NUT
Filed April 19, 1927
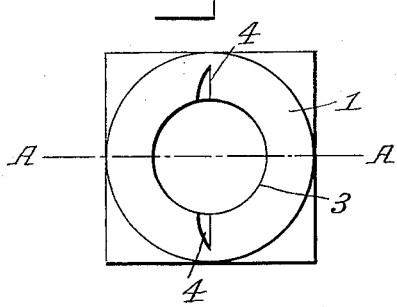
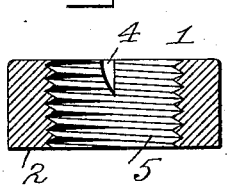
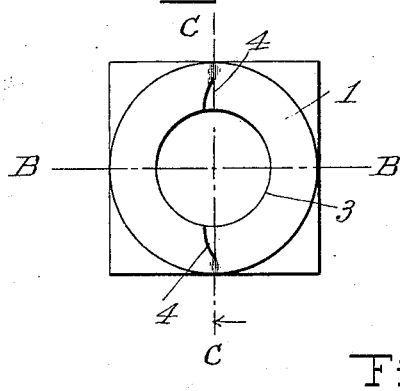
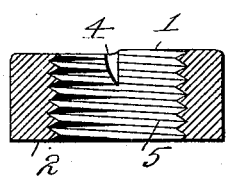
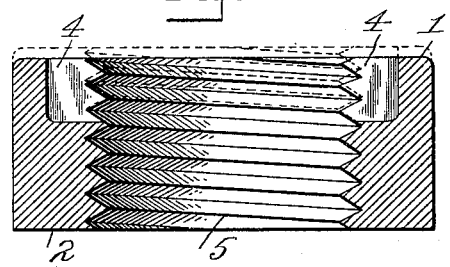
Inventor
Paul W. Dieter
By his Attorney
Wm. A. Courtland Patented Mar. 18, 1930

1,750,926

UNITED STATES PATENT OFFICE

PAUL W. DIETER, OF NEW YORK, N. Y.

LOCK NUT

Application filed April 19, 1927. Serial No. 184,934.

This invention relates to improvements in lock nuts of the kind that are adapted to be self-locking, binding and holding and not dependent upon the use of expedients to retain the nut in locked condition, when it is applied to its component member.

The object of the present invention is to produce a nut that will have all the advantages of the present standard nut, be self-locking, and meet every condition of requirement set for practicability of operation and economy of production.

Another object of the invention is to make a nut wherein only a portion of the threads thereof will be employed to produce the required locking action, when said nut is applied to its bolt.

The important feature of this invention resides in compressing a portion of the nut axially, after said nut has been cut, punched and threaded, in such manner that a plurality of the outer threads on the compressed portion of said nut will be thrown out of alinement with the corresponding outer threads on the portion of the nut not compressed. After the nut is cut, punched and threaded, a plurality of notches are made partially through the nut on an axial plane from the outer face thereof. Preferably these cuts are made on opposite sides of the nut to permit one of the divisions made by said cuts to be compressed, in the manner and for the purpose heretofore set forth.

In the accompanying drawings:

Figure 1 is a plan view of the nut before it is compressed.

Figure 2 is a section on the line A—A, Figure 1.

Figure 3 is a plan view of the nut after it has been compressed.

Figure 4 is a section on the line B—B, Figure 3.

Figure 5 is an enlarged section on the line C—C, Figure 3, showing the nut compressed in full lines, the dotted lines showing the approximate degree of compression.

In the general construction and application of the present invention, any standard form of nut blank may be used, here shown as a square form. The nut blank has punched therethrough in the usual manner, between the working faces 1 and 2, the central bore 3, after which said blank has two notches 4 cut axially in the walls of the nut in a manner to extend into the bore 3. These notches 4 are preferably made in the form shown and extend only partially through the blank. The blank is now in condition to be screw threaded in the manner shown at 5, Figure 2.

After the nut blank has been punched, the notches cut therein and threaded in the desired manner, the underside or working face 2 of the nut is wholly engaged by any suitable means, such as a die or the like and firmly held while one half or a portion of the outer face of the nut, on a transverse plane and on a line with the notches, is engaged by any suitable means, usually a die, and said half or portion of the nut compressed until it assumes the condition shown in Figure 4, that is, out of facial alinement with the other half or portion of said nut.

Compressing the nut in this manner will force a certain number of the threads, those adjacent the outer face 1, to be more or less offset with relation to the threads in that half or portion of the nut that has not been compressed, thereby causing the threads on the bolt when forced into engagement with said bolt to be firmly locked in the desired manner.

It should be understood that the degree of offset in the compressed portion of the nut is just sufficient to produce the desired locking value, when the bolt threads are forced into the threads of said nut.

It will be noticed by referring to Figure 5 that compressing one half or portion of the nut the amount shown between the dotted line and full line of the outer face 1, that only the three top threads of the compressed portion are affected, the top thread the most, the second thread less, the third thread slightly, the four and remaining threads remaining normal.

The notches do not have to be of any predetermined depth, shape or width to obtain the desired result, but practical demonstrations of the results to be obtained have shown that the proportions disclosed are best suited to accomplish the intended purposes.

Producing a lock nut by offsetting the threads in only a portion of the top of the nut permits the threads adjacent the working face 2 of the nut to remain in their normal condition, thereby permitting said nut to be freely applied to its component member.

Compressing one half or portion of the nut will not change the pitch of the threads, nor will the diametrical proportions of the bore be changed, said compression only acting to offset a plurality of the top threads with relation to the threads in the top portion of the nut not compressed.

The present form of nut in its general formation and configuration conforms in every particular to the recognized standards as to size, pitch and shape with its working face 2 preserved to meet required conditions.

The nut can be applied to and removed from the bolt an indefinite number of times without impairing the permanency of its locking efficiency.

I claim:

A nut provided with a threaded bore and diametrically opposed grooves opening through the outer end of said nut and into said bore, the outer end of said nut at one side only of said grooves being compressed axially on a line with said grooves to provide a definitely stepped offset relation between the portions of the threads at opposite sides of the nut.

PAUL W. DIETER.